(12) United States Patent
Matsuoka et al.

(10) Patent No.: US 12,545,056 B2
(45) Date of Patent: Feb. 10, 2026

(54) TIRE

(71) Applicant: Sumitomo Rubber Industries, Ltd., Kobe (JP)

(72) Inventors: Kenichiro Matsuoka, Kobe (JP); Yoshifumi Kawagoe, Kobe (JP)

(73) Assignee: SUMITOMO RUBBER INDUSTRIES, LTD., Kobe (JP)

( * ) Notice: Subject to any disclaimer, the term of this patent is extended or adjusted under 35 U.S.C. 154(b) by 0 days.

(21) Appl. No.: 18/677,205

(22) Filed: May 29, 2024

(65) Prior Publication Data

US 2025/0001810 A1    Jan. 2, 2025

(30) Foreign Application Priority Data

Jun. 28, 2023  (JP) ................. 2023-106271

(51) Int. Cl.
  *B60C 11/03*    (2006.01)
  *B60C 11/12*    (2006.01)

(52) U.S. Cl.
  CPC ...... *B60C 11/1236* (2013.01); *B60C 11/0302* (2013.01); *B60C 11/0304* (2013.01); *B60C 11/1204* (2013.01); *B60C 11/1281* (2013.01)

(58) Field of Classification Search
  CPC ............ B60C 11/1204; B60C 11/1236; B60C 11/1281; B60C 11/0304
  See application file for complete search history.

(56) References Cited

U.S. PATENT DOCUMENTS

| | | | | |
|---|---|---|---|---|
| 2,272,879 A | * | 2/1942 | Hargraves | B60C 11/1263 D12/598 |
| D869,382 S | * | 12/2019 | Speziari | D12/521 |
| D918,825 S | * | 5/2021 | Wu | D12/528 |
| 2013/0000805 A1 | * | 1/2013 | Oodaira | B60C 11/1263 152/209.1 |
| 2016/0193880 A1 | * | 7/2016 | Colombo | B60C 11/0306 152/209.8 |
| 2017/0368885 A1 | * | 12/2017 | Fujimoto | B60C 11/12 |
| 2019/0329599 A1 | | 10/2019 | Horiguchi et al. | |
| 2020/0369089 A1 | * | 11/2020 | Speziari | B60C 11/00 |
| 2022/0203773 A1 | * | 6/2022 | Hagihara | B60C 11/1263 |
| 2025/0001806 A1 | * | 1/2025 | Sakakibara | B60C 11/0304 |

FOREIGN PATENT DOCUMENTS

| | | | |
|---|---|---|---|
| JP | 60-255506 A | * | 12/1985 |
| JP | 2019-189106 A | | 10/2019 |

OTHER PUBLICATIONS

Machine translation for Japan 60-255506 (Year: 2025).*

* cited by examiner

*Primary Examiner* — Steven D Maki
(74) *Attorney, Agent, or Firm* — Birch, Stewart, Kolasch & Birch, LLP

(57) ABSTRACT

A tire comprises a tread portion comprising at least one land portion having a first longitudinal edge, a second longitudinal edge, and a ground contacting top surface therebetween. The land portion is provided with first sipes, second sipes and third sipes. Each first sipe is inclined with respect to the tire axial direction to a first direction. Each second sipe is inclined with respect to the tire axial direction to a direction opposite to the first direction. The third sipe comprises a first oblique portion extending from the first longitudinal edge and inclined to the first direction, and a second oblique portion extending from the second longitudinal edge and inclined to a direction opposite to the first direction.

14 Claims, 8 Drawing Sheets

TIRE

TECHNICAL FIELD

The present disclosure relates to a tire.

BACKGROUND ART

Patent Document 1 listed below discloses a tire in which a plurality of lateral grooves are provided in a land portion.

The lateral groove comprises a first portion extending from a first longitudinal edge of the land portion, a second portion extending from a second longitudinal edge of the land portion, and a connecting portion connecting between the first portion and the second portion. The connecting portion comprises a raised bottom portion.

In the tire of Patent Document 1, the lateral grooves comprising the above-mentioned connecting portions are provided in order to improve the steering stability on dry road surfaces and on-snow performance.

PRIOR ART DOCUMENT

Patent Document

Patent Document 1: Japanese Patent Application Publication No. 2019-189106

SUMMARY OF THE INVENTION

Problems to be Solved by the Invention

In recent years, as the performance of vehicles has improved, there has been a demand for tires to be further improved in on-snow performance.

In response to such a demand, for example, it is conceivable to provide sipes on the land portions of the tire.

However, as the sipes reduce the rigidity of the land portions, they have a tendency to deteriorate the steering stability on dry road surfaces.

The present disclosure was therefore made in view of the above-mentioned circumstances, and a primary objective of the present disclosure is to provide a tire improved in on-snow performance while maintaining the steering stability on dry road surfaces.

Means for Solving the Problems

According to the present disclosure, a tire comprises:
a tread portion comprising at least one land portion having
  a first longitudinal edge extending in the tire circumferential direction, a second longitudinal edge extending in the tire circumferential direction, and a ground contacting top surface between the first longitudinal edge and the second longitudinal edge,
wherein
  the above-said at least one land portion is provided with a plurality of first sipes, a plurality of second sipes and a plurality of third sipes,
wherein
  each of the first sipes extends from the first longitudinal edge toward the second longitudinal edge while inclining with respect to a tire axial direction to a first direction, and having a closed end within the ground contacting top surface,
  each of the second sipes extends from the second longitudinal edge toward the first longitudinal edge while inclining with respect to the tire axial direction to the first direction, and having a closed end within the ground contacting top surface,
  each of third sipes extends from the first longitudinal edge to the second longitudinal edge, and comprises
    a first oblique portion extending from the first longitudinal edge toward the second longitudinal edge while inclining with respect to the tire axial direction to the first direction, and
    a second oblique portion extending from the second longitudinal edge toward the first longitudinal edge while inclining with respect to the tire axial direction to the first direction.

Here, the first direction means a direction toward one side in the tire circumferential direction, and a second direction means a direction toward the other side in the tire circumferential direction.

Effects of the Invention

Owing to the above-mentioned configuration, the tire according to the present disclosure can be improved in on-snow performance while maintaining steering stability on dry road surfaces.

DETAILED DESCRIPTION OF THE INVENTION

An embodiment of the present disclosure will now be described in detail in conjunction with accompanying drawings. Incidentally, the drawings may include exaggerated depictions different from actual dimensional relationships in order to facilitate understanding of the present disclosure.

Figure 1:
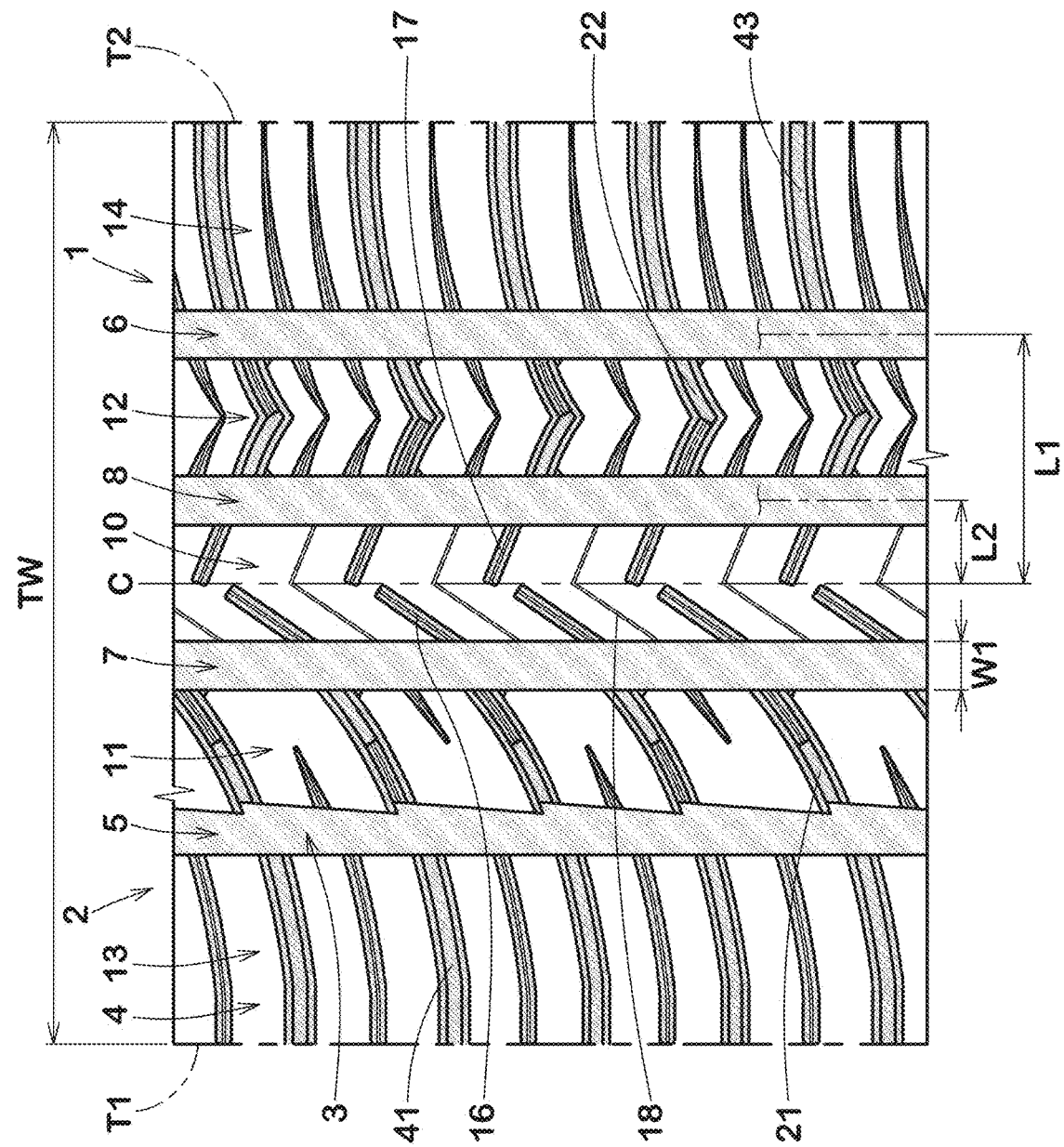
FIG. 1 is a developed partial view of a tread portion of a tire as an embodiment of the present disclosure.

FIG. 1 is a developed partial view of a tread portion 2 of a tire 1 as an embodiment of the present disclosure.

The tire 1 in this embodiment is a pneumatic tire for a passenger car, and is designed as so-called all-season tire (also called all-weather tire) which can be suitably used to drive on snowy roads in addition to wet roads and dry roads.

However, the present disclosure may be applied to pneumatic tires for heavy duty vehicles such as trucks and buses as well as non-pneumatic tires so-called airless tires in which pressurized air is not used or filled to support the tire load.

As shown in FIG. 1, the tread portion 2 according to the present disclosure comprises at least one land portion 4.

In this embodiment, the tread portion 2 comprises a first tread edge T1, a second tread edge T2, a plurality of circumferential grooves 3 extending continuously in the tire circumferential direction and disposed between the first tread edge T1 and the second tread edge T2, and a plurality of the land portions 4 divided by the circumferential grooves 3.

More specifically, in the tire 1 of the present embodiment, the tread portion 2 is composed of five land portions 4 divided by four circumferential grooves 3.

In FIG. 1, fine dot patterns are applied to openings of grooves and sipes opened at the tread surface. Such fine dot patterns are omitted in the figures other than FIG. 1.

In the tire 1 in this embodiment, the orientation of the tread portion 2 (tread pattern) when the tire is mounted on a vehicle is specified such that the first tread edge T1 is to be outboard of the vehicle, and the second tread edge T2 is to be inboard of the vehicle. Such tire mounting direction is indicated, for example, on the tire sidewall portions (not shown) with letters, symbols or the like. The present disclosure is, however, not limited to such embodiment, and may be embodied as a tire of which mounting direction on a vehicle is not specified.

The first tread edge T1 and the second tread edge T2 correspond to the axially outermost edges of the ground contacting surface of the tread portion 2 when the tire under a standard state is placed on a flat surface at a camber angle of 0 degrees by applying 70% of a standard tire load.

In the case that the tire 1 is a type of pneumatic tire for which various standards have been established, the standard state is a state of the tire which is mounted on a standard wheel rim and inflated to a standard tire pressure but loaded with no tire load.

In the case that the tire 1 is a tire for which various standards are not yet established or a non-pneumatic tire, the standard state means a standard usage state according to the purpose of use of the tire and in a condition in which the tire is not installed on a vehicle and no tire load is applied.

In this application including specification and claims, dimensions and positions of each part or portion of the tire refer to those under the standard state unless otherwise noted.

The standard wheel rim is a wheel rim specified for the tire 1 in a standard system including standards on which the tire 1 is based, for example, the "Standard rim" in JATMA, "Design Rim" in TRA, "Measuring Rim" in ETRTO.

The standard tire pressure is air pressure specified for the tire 1 in a standard system including standards on which the tire 1 is based, for example, the "maximum air pressure" in JATMA, "INFLATION PRESSURE" in ETRTO, and the maximum air pressure listed in the table "TIRE LOAD LIMITS AT VARIOUS COLD INFLATION PRESSURES" in TRA.

The standard tire load is a load specified for the tire 1 in a standard system including standards on which the tire 1 is based, for example, the "maximum load capacity" in JATMA, "LOAD CAPACITY" in ETRTO, and the maximum tire load listed in the table "TIRE LOAD LIMITS AT VARIOUS COLD INFLATION PRESSURES" in TRA.

In the case that various standards have not been established for the tire 1, the standard tire load refers to the maximum load that can be applied when using the tire 1 according to the above-mentioned standards.

In this embodiment, the circumferential grooves 3 include a first shoulder circumferential groove 5, a second shoulder circumferential groove 6, a first crown circumferential groove 7, and a second crown circumferential groove 8.

The first shoulder circumferential groove 5 is disposed closest to the first tread edge T1 among the circumferential grooves 3.

The second shoulder circumferential groove 6 is disposed closest to the second tread edge T2 among the circumferential grooves 3.

The first crown circumferential groove 7 is disposed between the first shoulder circumferential groove 5 and the tire equator C.

The second crown circumferential groove 8 is disposed between the second shoulder circumferential groove 6 and the tire equator C.

The distance L1 in the tire axial direction from the tire equator C to the groove center line of the first shoulder circumferential groove 5 is preferably not less than 20%, but not more than 35% of a tread width TW.

The distance L1 in the tire axial direction from the tire equator C to the groove center line of the second shoulder circumferential groove 6 is preferably not less than 20%, but not more than 35% of the tread width TW.

The distance L2 in the tire axial direction from the tire equator C to the groove center line of the first crown circumferential groove 7 is preferably not less than 5%, but not more than 15% of the tread width TW.

The distance L2 in the tire axial direction from the tire equator C to the groove center line of the second crown circumferential groove 8 is preferably not less than 5%, but not more than 15% of the tread width TW.

Here, the tread width TW is the distance in the tire axial direction from the first tread edge T1 to the second tread edge T2 measured under the standard state of the tire.

In this application, when a numerical range of a parameter is described, it means a numerical range of the average value of the parameter unless otherwise noted. The "average value" can be obtained for example by dividing a measurement target for the parameter into multiple micro-regions of appropriate size, measuring the parameter of each micro-region, summing up the measured values of parameter of the micro-regions, and dividing the sum total by the number of the micro-regions.

It is preferable that the groove width W1 of each of the circumferential grooves 3 is at least 3 mm.

It is preferable that the groove width W1 of each of the circumferential grooves 3 is not less than 3.0%, but not more than 7.0% of the tread width TW.

The depth of each of the circumferential grooves 3 is preferably not less than 5 mm but not more than 10 mm in the case that the tire 1 is a pneumatic tire for passenger cars.

In each of the first crown circumferential groove 7, the second crown circumferential groove 8 and the second shoulder circumferential groove 6 in this embodiment, each of the groove edges on both sides extends linearly on a straight line which is parallel to the tire circumferential direction.

However, in the first shoulder circumferential groove 5, the groove edge on the first tread edge T1 side extends linearly on a straight line in parallel to the tire circumferential direction, whereas the groove edge on the second tread edge T2 side extends in a zigzag shape. Such zigzag groove edge helps to improve on-snow traction performance.

The land portions 4 in this embodiment include a crown land portion 10, a first middle land portion 11, a second middle land portion 12, a first shoulder land portion 13 and a second shoulder land portion 14.

The crown land portion 10 is defined between the first crown circumferential groove 7 and the second crown circumferential groove 8. Thereby, the crown land portion 10 is positioned on the tire equator C.

The first middle land portion 11 is defined between the first shoulder circumferential groove 5 and the first crown circumferential groove 7.

The second middle land portion 12 is defined between the second shoulder circumferential groove 6 and the second crown circumferential groove 8.

The first shoulder land portion 13 is defined axially outside the first shoulder circumferential groove 5 and includes the first tread edge T1.

The second shoulder land portion 14 is defined axially outside the second shoulder circumferential groove 6 and includes the second tread edge T2.

Figure 2:
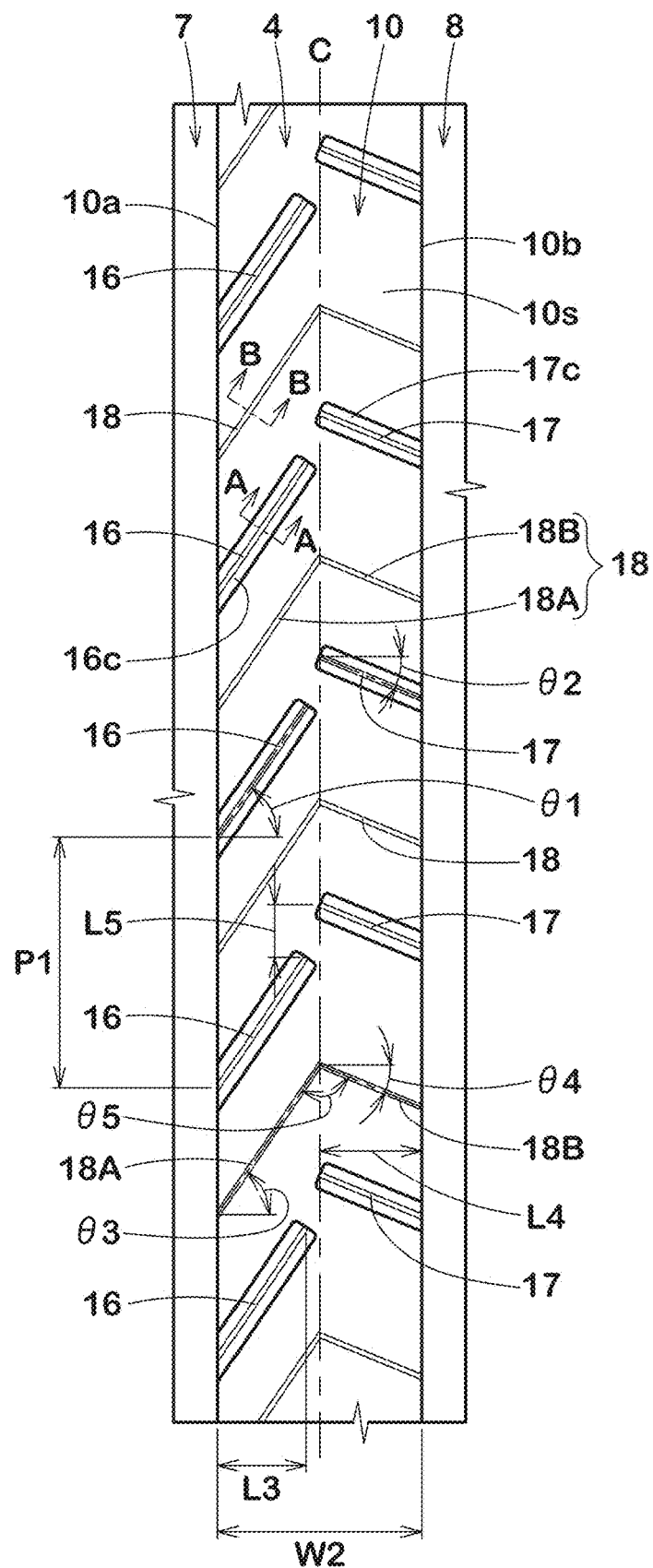
FIG. 2 is a partial top view of a crown land portion shown in FIG. 1.

FIG. 2 is a partial top view of the crown land portion 10 as an example of the above-said at least one land portion 4.

As shown in FIG. 2, the crown land portion 10 (or land portion 4) has a first longitudinal edge 10a extending in the tire circumferential direction on the first tread edge T1 side,
a second longitudinal edge 10b extending in the tire circumferential direction on the second tread edge T2 side, and
a ground contacting top surface 10s between the first longitudinal edge 10a and the second longitudinal edge 10b.

The crown land portion 10 (land portion 4) is provided with a plurality of first sipes 16, a plurality of second sipes 17, and a plurality of third sipes 18.

In this application, the term "sipe" refers to a fine groove or cut of which main portion has a small width of not more than 1.5 mm or has no substantial width when measured between the two opposite walls (hereinafter referred to as "sipe walls"). Here, the main portion refers to a portion where the opposite two sipe walls extend in the tire radial direction in substantially parallel to each other.

The expression "substantially parallel" means that the angle formed between the two sipe walls is at most 10 degrees.

Such sipe may be provided with a chamfer as described later.

Further, such sipe may be provided with a so-called flask bottom, namely, the width of the sipe can be increased more than 1.5 mm in a portion near the sipe bottom.

When the ground pressure is applied to the portion around the sipe, the two sipe walls in the main portion come into contact with each other owing to the above-described configuration of the sipe, and the apparent rigidity of the portion around the sipe can be maintained.

Contrary to such a sipe, what is referred to as a groove in this application, has two opposite groove walls which do not come into contact with each other even when ground pressure is applied and maintains a substantial drainage path.

Thus, the groove width of each groove is, for example, 2.0 mm or more.

Each of the first sipes 16 extends from the first longitudinal edge 10a and has a closed end within the ground contacting top surface 10s.

Each of the second sipes 17 extends from the second longitudinal edge 10b and has a closed end within the ground contacting top surface 10s.

Each of the third sipes 18 extends from the first longitudinal edge 10a to the second longitudinal edge 10b.

Each of the first sipes 16 is inclined with respect to the tire axial direction to a first direction toward the second longitudinal edge 10b from the first longitudinal edge 10a (in the drawings, the inclination is upward to the right).

Each of the second sipes 17 is inclined with respect to the tire axial direction to a second direction opposite to the first direction toward the second longitudinal edge 10b from the first longitudinal edge 10a (in the drawings, the inclination is downward to the right).

Each of the third sipes 18 comprises a first oblique portion 18A and a second oblique portion 18B.

The first oblique portion 18A extends from the first longitudinal edge 10a toward the second longitudinal edge 10b, while inclining with respect to the tire axial direction to the first direction.

The second oblique portion 18B extends from the second longitudinal edge 10b toward the first longitudinal edge 10a while inclining with respect to the tire axial direction to the first direction.

By employing such sipe configuration, the tire according to the present disclosure can be improved in on-snow performance, while maintaining the steering stability on dry road surfaces (hereinafter simply referred to as the steering stability). The reason is as follows.

In the tire 1 according to the present disclosure, one of the land portions 4 (in this embodiment, the crown land portion 10) is provided with the first sipes 16, the second sipes 17 and the third sipes 18 described above.

These sipes 16, 17 and 18 can provide frictional force in multiple directions when driving on snow, and help to improve the on-snow performance.

On the other hand, since the first sipes 16 and the second sipes 17 respectively have the closed ends within the land portion, it is helpful for maintaining the rigidity of the land portion and maintaining the steering stability on dry road surfaces.

Further, in the present disclosure, the first sipes 16 and the first oblique portions 18A of the third sipes 18 extend from the first longitudinal edge 10a while inclining to the same direction, and
the second sipes 17 and the second oblique portion 18B of the third sipe 18 extend from the second longitudinal edge 10b while inclining to the same direction.

Thereby, between the first sipes 16 and the third sipes 18, and between the second sipes 17 and the third sipes 18, there are less likely to occur regions where the land portion rigidity is locally reduced, thereby, it becomes possible to more surely maintain the steering stability.

Through such mechanism, the tire 1 according to the present disclosure can be improved in the on-snow performance while maintaining the steering stability on dry road surfaces.

More detailed configurations in the present embodiment will be described below.

In the present embodiment, between every two of the circumferentially adjacent third sipes 18, there are disposed one of the first sipes 16 and one of the second sipes 17.

Thus, the third sipes 18 are alternated with pairs of one of the first sipes 16 and one of the second sipes 17 in the tire circumferential direction.

This sipe arrangement makes the rigidity distribution of the crown land portion 10 uniform, and can surely maintain the steering stability on dry road surfaces.

Further, this sipe arrangement reduces the impact sound generated when the crown land portion 10 contacts with the ground, and improves noise performance as well as wear resistance performance of the crown land portion 10.

The first sipes 16 in this example extends linearly at a constant inclination angle toward the above-mentioned first direction. But, the first sipes 16 may be smoothly curved.

The length L3 in the tire axial direction of the first sipe 16 is preferably not less than 30%, more preferably not less than 40%, but preferably not more than 60%, more preferably not more than 50% of the maximum width W2 in the tire axial direction of the ground contacting top surface 10s of the crown land portion 10.

Such first sipes 16 help to improve the steering stability and on-snow performance in a well-balanced manner.

The above-mentioned length L3 corresponds to the length in the tire axial direction of a center line that divides the width of the sipe into two equal parts. The same applies to the lengths of the sipes described below.

The angle θ1 of the first sipe 16 with respect to the tire axial direction is preferably not less than 40 degrees, more preferably not less than 50 degrees, but preferably not more than 70 degrees, more preferably not more than 60 degrees. Thereby, the traction performance and cornering performance when driving on snow can be improved in a well-balanced manner.

When the first sipe 16 is curved, the angle θ1 is the average angle of the first sipe 16 with respect to the tire axial direction.

The average angle corresponds to a value obtained by dividing the first sipe 16 into a plurality of minute sipe pieces, summing up the angles of the respective minute sipe pieces, and dividing the sum total by the number of the minute sipe pieces.

The same applies to the angles of other sipes and lateral grooves when curved unless otherwise noted.

Figure 3:
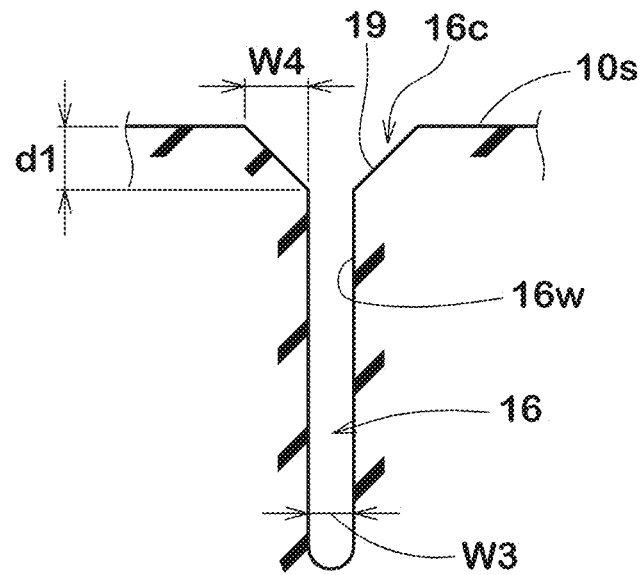
FIG. 3 is a cross-sectional view taken along line A-A in FIG. 2.

FIG. 3 shows a cross-sectional view taken along line A-A in FIG. 2.

As shown in FIGS. 2 and 3, at least a portion of the first sipe 16 is provided with a chamfer 16c.

As shown in FIG. 3, the chamfer 16c is a sloped surface 19 extending between the ground contacting top surface 10s of the land portion and the sipe wall 16w at a certain angle with respect to a normal line to the ground contacting top surface 10s in a cross section perpendicular to the longitudinal direction of the sipe.

The sipe with the chamfer 16c can prevent the ground contacting top surface 10s from lifting off the road surface around the opening, and helps to equalize the ground pressure to prevent uneven wear.

From the viewpoint of exhibiting this effect, the width W4 of the sloped surface 19 or the chamfer 16c is at least 50% of the width W3 of the main portion of the sipe.

The width W4 of the sloped surface 19 is preferably not less than 0.5 mm, more preferably not less than 1.0 mm, but preferably not more than 2.0 mm, more preferably not more than 1.5 mm.

The depth d1 of the chamfer 16c is not less than 0.5 mm, but not more than 2.0 mm, for example.

In this embodiment, as shown in FIGS. 2 and 3, the chamfer 16c is provided on each side in the width direction, of the first sipe 16.

However, the chamfer 16c may be provided on only one side of the first sipe 16 in the width direction.

In this embodiment, as shown in FIG. 2, the chamfer 16c is provided over the entire length of the first sipe 16. Thereby, the ground pressure can be made uniform around the first sipe 16, and the steering stability can be reliably improved.

Further, such chamfer 16c reduces the impact sound generated when the first sipe 16 edges contact with the ground, and can improve the noise performance.

It is preferable that the width of the chamfer 16c is constant over 80% or more of the first sipes 16 in the length direction. Thereby, uneven wear around the first sipes 16 can be suppressed, and the wear resistance performance can be improved.

The second sipe 17 in this example extends linearly at a certain angle, inclining to the second direction toward the second longitudinal edge 10b. But, the second sipe 17 may be smoothly curved.

The length L4 in the tire axial direction of the second sipe 17 is preferably not less than 30%, more preferably not less than 40%, but preferably not more than 60%, more preferably not more than 50% of the maximum width W2 in the tire axial direction of the ground contacting top surface 10s of the crown land portion 10.

Further, it is preferable that the length of the second sipe 17 measured therealong is less than 100%, more preferably from 60% to 75% of the length of the first sipe 16 measured therealong.

Such second sipe 17 helps to improve the steering stability and the on-snow performance in a well-balanced manner.

The angle θ2 of the second sipe 17 with respect to the tire axial direction is smaller than the angle θ1 of the first sipes 16 with respect to the tire axial direction. Specifically, the angle θ2 of the second sipe 17 with respect to the tire axial direction is preferably not less than 10 degrees, more preferably not less than 20 degrees, but preferably not more than 40 degrees, more preferably not more than 30 degrees. Such second sipes 17, in cooperation with the first sipes 16, help to improve the traction performance and the cornering performance in a well-balanced manner when running on snow.

In this embodiment, at least a portion of the second sipe 17 is provided with a chamfer 17c.

For the chamfer 17c of the second sipe 17, the above-described configuration of the chamfer 16c of the first sipe 16 (shown in FIG. 3) can be employed, therefore, redundant descriptions will be omitted.

Preferably, the chamfer 17c is provided over the entire length of the second sipe 17. Preferably, the width of the chamfer 17c of the second sipe 17 is constant over at least 80% of the second sipe 17 in the length direction.

Thereby, the steering stability as well as the noise performance and wear resistance can be improved.

The distance L5 in the tire circumferential direction from the closed end of the first sipe 16 closed in the ground contacting top surface 10s of the crown land portion 10 to the closed end of the second sipe 17 closed in the ground contacting top surface 10s, is not more than 30%, preferably 10% to 15% of one pitch length P1 of the first sipes 16 in the tire circumferential direction.

Here, the one pitch length P1 corresponds to the distance in the tire circumferential direction between the ends on the first longitudinal edge 10a side, of the two first sipes 16 adjacent to each other in the tire circumferential direction.

Thereby, the first sipe 16 and the second sipe 17 can work together to improve the on-snow performance, while maintaining the steering stability.

The third sipe 18 in this example is composed of only the first oblique portion 18A and the second oblique portion 18B. Thereby, the third sipe 18 is bent convexly toward one side in the tire circumferential direction.

In this example, the intersection of the first oblique portion 18A and the second oblique portion 18B is positioned in the central part of the ground contacting top surface 10s when divided into three equal parts in the tire axial direction. Thereby, while suppressing uneven wear of the crown land portion 10, the above-mentioned effect can be exhibited. The third sipe 18 is however, not limited to such configuration.

In this example, the first oblique portion 18A of the third sipe 18 extends linearly from the first longitudinal edge 10a toward the second longitudinal edge 10b while inclining to the above-mentioned first direction. However, the first oblique portion 18A may be smoothly curved.

The angle θ3 of the first oblique portion 18A with respect to the tire axial direction is preferably not less than 40 degrees, more preferably not less than 50 degrees, but preferably not more than 70 degrees, more preferably not more than 60 degrees. Thereby, the traction performance and the cornering performance when running on snow are improved in a well-balanced manner.

In this example, The second oblique portion 18B of the third sipe 18 extends linearly from the second longitudinal edge 10b toward the first longitudinal edge 10a while inclining to the above-mentioned first direction. However, the second oblique portion 18B may be smoothly curved.

The angle θ4 of the second oblique portion 18B with respect to the tire axial direction is preferably not less than 10 degrees, more preferably not less than 20 degrees, but preferably not more than 40 degrees, more preferably not more than 30 degrees. Thereby, the traction performance and the cornering performance when running on snow are improved in a well-balanced manner.

The angle θ3 of the first oblique portion 18A with respect to the tire axial direction is larger than the angle θ4 of the second oblique portion 18B with respect to the tire axial direction. Thereby, the energy of the impact sound generated when the edges of the first oblique portion 18A and the second oblique portion 18B contact with the ground is dispersed over a wide frequency band, and the noise performance is improved.

The angle θ5 between the first oblique portion 18A and the second oblique portion 18B is, for example, not less than 90 degrees, but not more than 120 degrees. Thereby, the traction performance and the cornering performance when running on snow is improved.

When at least one of the first oblique portion 18A and the second oblique portion 18B is curved, the angle θ5 is defined as an angle between a straight line drawn between both ends of the first oblique portion 18A, and a straight line drawn between both ends of the second oblique portion 18B.

Figure 4:
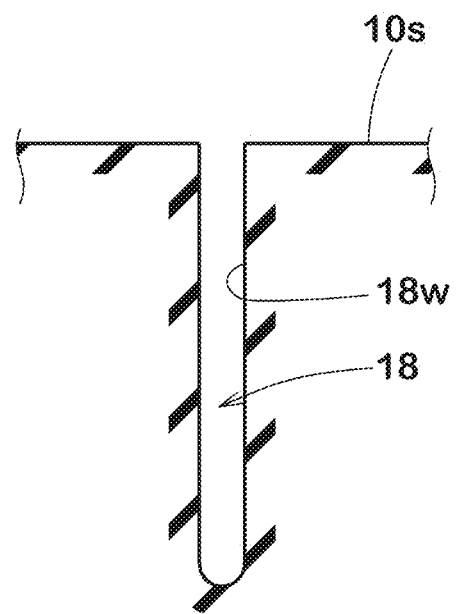
FIG. 4 is a cross-sectional view taken along line B-B in FIG. 2.

FIG. 4 is a cross-sectional view taken along line B-B in FIG. 2.

As shown in FIG. 4, the third sipe 18 is not provided with a chamfer. That is, the sipe walls 18w of the third sipe 18 intersect with the ground contacting top surface 10s at a substantially right angle to form angular corners.

Further, as shown in FIG. 2, in any part in the length direction of the third sipe 18, there is provided with no chamfer.

Such third sipes 18 can provide large frictional forces by the edges when driving on icy roads.

Figure 5:
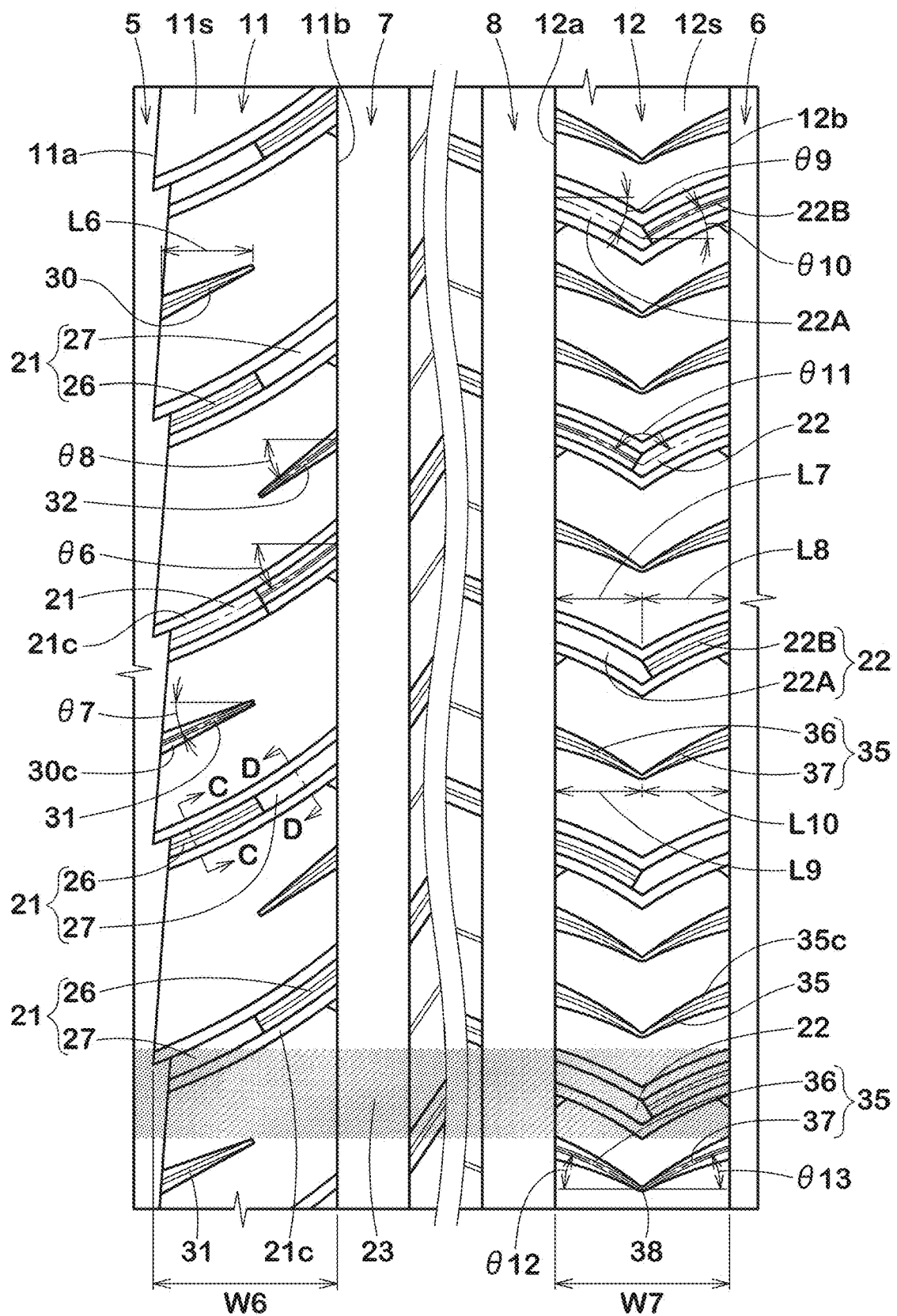
FIG. 5 shows a partial top view of a first middle land portion and a partial top view of a second middle land portion which are shown in FIG. 1.

FIG. 5 shows a partial top view of the first middle land portion 11 and a partial top view of the second middle land portion 12.

In FIG. 5, the crown land portion 10 provided between these land portions 11 and 12 is almost omitted.

As shown in FIG. 5, the first middle land portion 11 has a first longitudinal edge 11a on the first tread edge T1 side, a second longitudinal edge 11b on the second tread edge T2 side, and a ground contacting top surface 11s between the first longitudinal edge 11a and the second longitudinal edge 11b, and the second middle land portion 12 has a first longitudinal edge 12a on the first tread edge T1 side, a second longitudinal edge 12b on the second tread edge T2 side, and a ground contacting top surface 12s between the first longitudinal edge 12a and the second longitudinal edge 12b.

The first middle land portion 11 is provided with a plurality of first middle lateral grooves 21 extending from the first longitudinal edge 11a to the second longitudinal edge 11b.

The first middle lateral grooves 21 are inclined with respect to the tire axial direction to the first direction while extending from the first longitudinal edge 11a to the second longitudinal edge 11b of the first middle land portion 11.

The second middle land portion 12 is provided with a plurality of second middle lateral grooves 22 extending from the first longitudinal edge 12a to the second longitudinal edge 12b.

The second middle lateral grooves 22 each comprise a first oblique portion 22A and a second oblique portion 22B.

The first oblique portion 22A extends from the first longitudinal edge 12a toward the second longitudinal edge 12b of the second middle land portion 12, while inclining with respect to the tire axial direction to the second direction opposite to the first direction.

The second oblique portion 22B extends from the second longitudinal edge 12b toward the first longitudinal edge 12a of the second middle land portion 12, while inclining with respect to the tire axial direction to the second direction.

Such first middle lateral grooves 21 and second middle lateral grooves 22 can exhibit high drainage performance on wet road surfaces and can generate shear forces in multiple directions by snow columns, namely, compacted snow blocks when running on snow. Thus, it is possible to effectively improve the wet performance and on-snow performance.

If the positions in the tire circumferential direction of the first middle lateral grooves 21 are the same as the positions in the tire circumferential direction of the second middle lateral grooves 22, the rigidity of the tread portion 2 in the tire circumferential direction is locally reduced due to these coincident lateral grooves 21 and 22, and the steering stability on dry road surfaces is liable to be deteriorated.

Therefore, in the present embodiment, in the plan view of the tread portion 2, when virtual extension zones 23 are respectively defined by extending circumferential extents of the respective second middle lateral grooves 22 toward the first tread edge T1 in parallel to the tire axial direction (in FIG. 5, only one of the virtual extension zones 23 is indicated by applying fine dots), the virtual extension zones 23 respectively overlap with openings of the respective first middle lateral grooves 21 so that the overlapping area between each virtual extension zone 23 and the opening of one of the first middle lateral grooves 21 is at most 50% of the area of the opening of the above-said one of the first middle lateral grooves 21.

Thereby, it becomes possible to control the above-mentioned problems to maintain the steering stability on dry road surfaces.

In order to surely improve the wet performance and on-snow performance, the second middle lateral grooves 22 are arranged in relation to the first middle lateral grooves 21 such that circumferential extents of the second middle lateral grooves 22 respectively overlap with circumferential extents of the respective first middle lateral grooves 21 in the tire circumferential direction. From the viewpoint of improving the wet performance, on-snow performance, and steering stability on dry road surfaces in a well-balanced manner, the above-mentioned overlapping area is preferably set to be not less than 10%, but not more than 30% of the area of the opening.

Each of the first middle lateral grooves 21 extends with a constant groove width.

The angle θ6 of each of the first middle lateral grooves 21 with respect to the tire axial direction is preferably not less than 15 degrees, more preferably not less than 20 degrees, but preferably not more than 50 degrees, more preferably not more than 40 degrees.

Further, the angle θ6 increases toward the second longitudinal edge 11*b*, therefore, the first middle lateral groove 21 is curved. Such first middle lateral groove 21 can improve the on-snow traction performance and on-snow cornering performance in a well-balanced manner.

Figure 6:
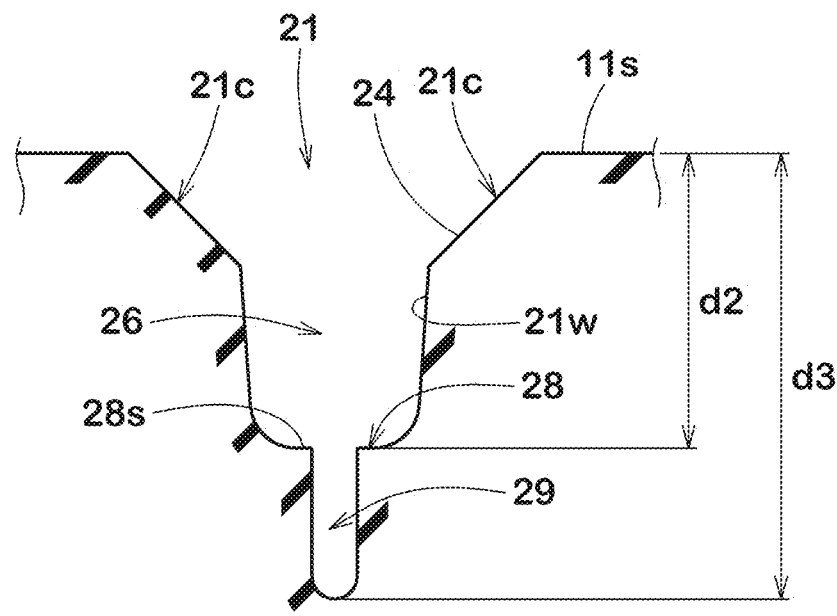
FIG. 6 is a cross-sectional view taken along line C-C in FIG. 5.

FIG. 6 is a cross-sectional view taken along line C-C in FIG. 5.

Figure 7:
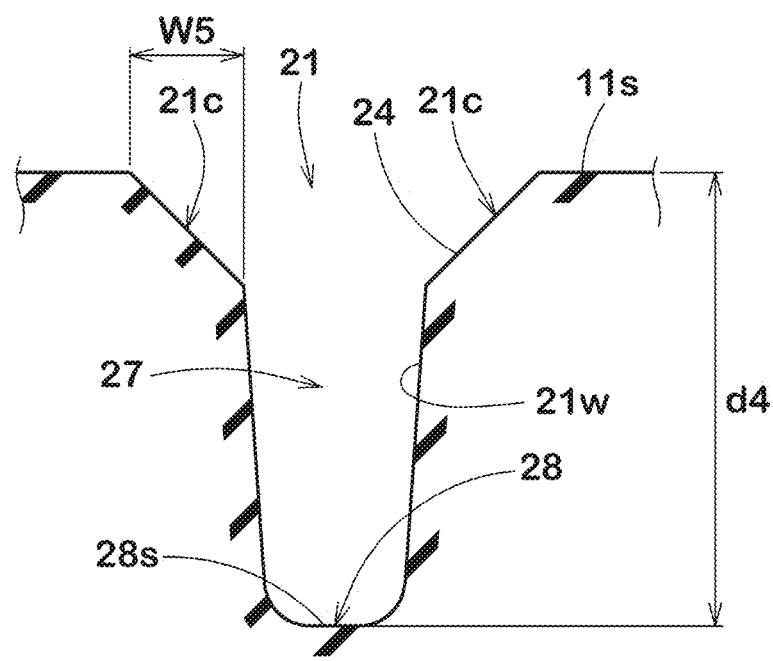
FIG. 7 is a cross-sectional view taken along line D-D in FIG. 5.

FIG. 7 is a cross-sectional view taken along line D-D in FIG. 5.

As shown in FIGS. 5 to 7, in this embodiment, the first middle lateral groove 21 is provided with a chamfer 21*c*.

As shown in FIGS. 6 and 7, the chamfer 21*c* is a sloped surface 24 extending between the ground contacting top surface 11*s* and the groove wall 21*w* of the groove 21 at a certain angle with respect to a normal line to the ground contacting top surface 11*s* in a cross section perpendicular to the longitudinal direction of the lateral groove.

The lateral groove 21 with the chamfer 21*c* can prevent the ground contacting top surface 11*s* from lifting off the road surface around the opening of the lateral groove, and helps to equalize the ground pressure to prevent uneven wear.

From the viewpoint of ensuring such effects, the width W5 of the chamfer 21*c* or sloped surface 24 as shown in FIG. 7 is 1.0 to 2.0 mm, for example.

In this embodiment, it is preferable that the chamfer 21*c* is provided on each side of the first middle lateral groove 21.

Further, it is preferable that the chamfers 21*c* are provided over the entire length of the first middle lateral groove 21 as shown in FIG. 5.

The width of each of the chamfers 21*c* is constant over 80% or more of the first middle lateral groove 21 in the length direction thereof.

As shown in FIGS. 5 to 7, the first middle lateral groove 21 comprises a first portion 26 (shown in FIG. 6) in which a sipe 29 is provided in the groove bottom 28, and a second portion 27 (shown in FIG. 7) in which no sipe is provided in the groove bottom 28.

As shown in FIG. 7, the second portion 27 has a groove depth d4.

As shown in FIG. 6, in the first portion 26, a depth d2 from the ground contacting top surface 11*s* to the outer surface 28*s* of the groove bottom 28 where the groove bottom 28 is provided with the sipe 29, is smaller than the groove depth d4 of the second portion 27.

When the outer surface 28*s* of the groove bottom 28 is divided into three equal parts in the groove width direction, the sipe 29 is disposed in the central part.

The depth d3 from the ground contacting top surface 11*s* to the bottom of the sipe 29 is set in a range from 130% to 170% of the above-mentioned depth d2.

Such first portion 26 helps to improve the steering stability, on-snow performance and wet performance in a well-balanced manner.

As shown in FIG. 7, the above-mentioned depth d4 of the second portion 27 is set in a range from 5.0 to 7.0 mm, for example.

The depth d4 of the second portion 27 is preferably set to be not less than 80%, but not more than 120% of the depth d3 of the first portion 26.

Such second portion 27 helps to improve the steering stability and wet performance in a well-balanced manner.

As shown in FIGS. 5, 20% to 50% portion of the first middle lateral groove 21 in its longitudinal direction is formed as the first portion 26, and the remaining portion is formed as the second portion 27.

Such first middle lateral groove 21 can surely exhibit the above-described effects.

In the present embodiment, the first middle lateral grooves 21 provided on the first middle land portion 11 include two types: one is such that the first portion 26 is located closer to the first tread edge T1 than the second portion 27, and the other is such that the second portion 27 is located closer to the first tread edge T1 than the first portion 26.

These two types of first middle lateral grooves 21 in which the first portions 26 are located at different positions are preferably arranged alternately in the tire circumferential direction. Thereby, wear resistance of the first middle land portion 11 can be improved.

In this embodiment, the first middle land portion 11 is provided with a plurality of terminating middle sipes 30.

Each of the terminating middle sipes 30 extends from the first longitudinal edge 11*a* or the second longitudinal edge 11*b*, and has a closed end within the ground contacting top surface 11*s*.

In this embodiment, the terminating middle sipes 30 include first terminating middle sipes 31 extending from the first longitudinal edge 11*a*, and second terminating middle sipes 32 extending from the second longitudinal edge 11*b*. The first terminating middle sipes 31 and the second terminating middle sipes 32 help to improve the wet performance and on-snow performance as well as the wear resistance performance.

In this embodiment, between every two of the circumferentially adjacent first middle lateral grooves 21, there is disposed only one terminating middle sipe 30. And preferably, the first terminating middle sipes 31 and the second terminating middle sipes 32 are alternately arranged in the tire circumferential direction. Thereby, wear resistance is further improved.

In this example, the terminating middle sipes 30 each extend linearly, and are inclined with respect to the tire axial direction to the first direction toward the second longitudinal edge 11*b* from the first longitudinal edge 11*a*.

The angle θ7 of the first terminating middle sipe 31 with respect to the tire axial direction is, for example, not less than 15 degrees, but not more than 50 degrees, preferably not more than 25 degrees.

The angle θ8 of the second terminating middle sipe 32 with respect to the tire axial direction is larger than the angle θ7 of the first terminating middle sipe 31.

Specifically, the angle θ8 is, for example, not less than 15 degrees, preferably not less than 30 degrees, but not more than 50 degrees, preferably not more than 40 degrees. Such terminating middle sipes 30 improve the traction performance and cornering performance on wet roads and snowy roads in a well-balanced manner.

The length L6 in the tire axial direction of each of the terminating middle sipes 30 is, for example, not less than 35%, preferably not less than 40%, but not more than 65%, preferably not more than 60% of the maximum width W6 of the ground contacting top surface 11s of the first middle land portion 11.

Thereby, while maintaining the wear resistance performance of the first middle land portion 11, the above-mentioned effects can be exhibited.

It is preferable that the terminating middle sipe 30 is provided with chamfers 30c.

For the chamfer 30c, the configuration of the chamfer 16c of the first sipe 16 shown in FIG. 3 can be employed, therefore, redundant descriptions will be omitted.

It is preferable that the width of the chamfer 30c of the terminating middle sipe 30 in this embodiment measured in the direction orthogonal to the longitudinal direction of the sipe, becomes smaller toward its closed end located within the ground contacting top surface 11s. Thereby, while obtaining the edge effect from the terminating middle sipe 30, uneven wear of the first middle land portion 11 can be suppressed.

The second middle lateral groove 22 is composed of only the first oblique portion 22A and the second oblique portion 22B.

The first oblique portion 22A and the second oblique portion 22B are connected with each other in the central part when the ground contacting top surface 12s of the second middle land portion 12 is divided into three equal parts in the tire axial direction.

Thus, the length L7 in the tire axial direction of the first oblique portion 22A and the length L8 in the tire axial direction of the second oblique portion 22B are between 40% and 60% of the maximum width W7 of the ground contacting top surface 12s of the second middle land portion 12.

Thereby, on-snow performance is improved while suppressing uneven wear of the second middle land portion 12.

The angle θ9 of the first oblique portion 22A with respect to the tire axial direction is, for example, not less than 5 degrees, but not more than 25 degrees.

The first oblique portion 22A may be curved so that the angle θ9 gradually increases toward the second tread edge T2.

The angle θ10 of the second oblique portion 22B with respect to the tire axial direction is, for example, not less than 5 degrees, but not more than 25 degrees.

The second oblique portion 22B may be curved so that the angle θ10 gradually increases toward the first tread edge T1 side.

Thereby, the drainage performance of the second middle lateral groove 22 is improved.

The angle θ11 between the first oblique portion 22A and the second oblique portion 22B is an obtuse angle, for example, and preferably in a range from 105 degrees to 135 degrees. Thereby, while suppressing uneven wear of the second middle land portion 12, the above-mentioned effects can be obtained.

When at least one of the first oblique portion 22A and the second oblique portion 22B is not straight, the angle θ11 is defined as an angle between a straight line drawn between both ends of the groove center line of the first oblique portion 22A and a straight line drawn between both ends of the groove center line of the second oblique portion 22B.

In each of the second middle lateral grooves 22, one of the first oblique portion 22A and the second oblique portion 22B is provided with a sipe in the groove bottom portion, but the other of the first oblique portion 22A and the second oblique portion 22B is provided with no sipe in the groove bottom portion.

In each of the second middle lateral grooves 22, for the region where the sipe is provided in the groove bottom portion, the above described structure of the first portion 26 (shown in FIG. 6) of the first middle lateral groove 21 can be employed, therefore, redundant descriptions will be omitted.

On the other hand, for the region where no sipe is provided in the groove bottom portion, the structure of the second portion 27 (shown in FIG. 7) of the first middle lateral groove 21 can be employed, therefore, redundant descriptions will be omitted.

Such second middle lateral grooves 22 can surely improve the wet performance and on-snow performance while maintaining the steering stability.

The second middle land portion 12 is provided with
the second middle lateral grooves 22 in which the sipe is provided in the groove bottom portion of the first oblique portion 22A, and
the second middle lateral grooves 22 in which the sipe is provided in the groove bottom portion of the second oblique portion 22B.

These two types of second middle lateral grooves 22 with different sipe arrangements are preferably alternately arranged in the tire circumferential direction. This improves the wear resistance of the second middle land portion 12.

The second middle land portion 12 is provided with a plurality of transverse middle sipes 35.

The transverse middle sipes 35 each extend from the first longitudinal edge 12a to the second longitudinal edge 12b of the second middle land portion 12.

In this embodiment, one or two transverse middle sipes 35 are provided between every two of the circumferentially adjacent second middle lateral grooves 22.

The transverse middle sipe 35 comprises a first sipe segment 36 and a second sipe segment 37 which has different inclining directions with respect to the tire axial direction.

The first sipe segment 36 is inclined with respect to the tire axial direction to the second direction while extending from the first longitudinal edge 12a.

As a result, the first sipe segment 36 extends along the first oblique portion 22A of the second middle lateral groove 22, and the angular difference therebetween is 5 degrees or less.

The angle θ12 of the first sipe segment 36 with respect to the tire axial direction is not less than 5 degrees, but not more than 25 degrees.

The second sipe segment 37 is inclined with respect to the tire axial direction to the first direction toward the second longitudinal edge 12b.

As a result, the second sipe segment 37 extends along the second oblique portion 22B of the second middle lateral groove 22, and the angular difference therebetween is 5 degrees or less.

The angle θ13 of the second sipe segment 37 with respect to the tire axial direction is not less than 5 degrees, but not more than 25 degrees.

By providing the first sipe segment 36 and second sipe segment 37 as described above, the transverse middle sipe 35 can provide frictional force in multiple directions on wet road surfaces.

The length L9 in the tire axial direction of the first sipe segment 36 is, for example, not less than 40%, but not more than 60% of the maximum width W7 in the tire axial direction of the ground contacting top surface 12s of the second middle land portion 12.

Preferably, the length L9 of the first sipe segment 36 is substantially the same as the length L7 in the tire axial direction of the first oblique portion 22A of the second middle lateral groove 22.

The length L10 in the tire axial direction of the second sipe segment 37 is, for example, not less than 40%, but not more than 60% of the maximum width W7 of the ground contacting top surface 12s of the second middle land portion 12.

Preferably, the length L10 is the same as the length L8 in the tire axial direction of the second oblique portion 22B of the second middle lateral groove 22.

Thereby, while suppressing uneven wear of the second middle land portion 12, the above-mentioned effects can be exhibited.

It is preferable that the transverse middle sipe 35 is provided with a chamfer 35c.

For the chamfer 35c, the configuration of the chamfer 16c of the first sipe 16 shown in FIG. 3 can be employed, therefore, redundant descriptions will be omitted.

In the present embodiment, it is preferable that the width of the chamfer 35c measured in the direction perpendicular to the longitudinal direction of the transverse middle sipe 35 becomes smaller toward the connection 38 between the first sipe segment 36 and the second sipe segment 37.

Thereby, while obtaining the edge effect of the transverse middle sipe 35, uneven wear of the second middle land portion 12 can be suppressed.

Figure 8:
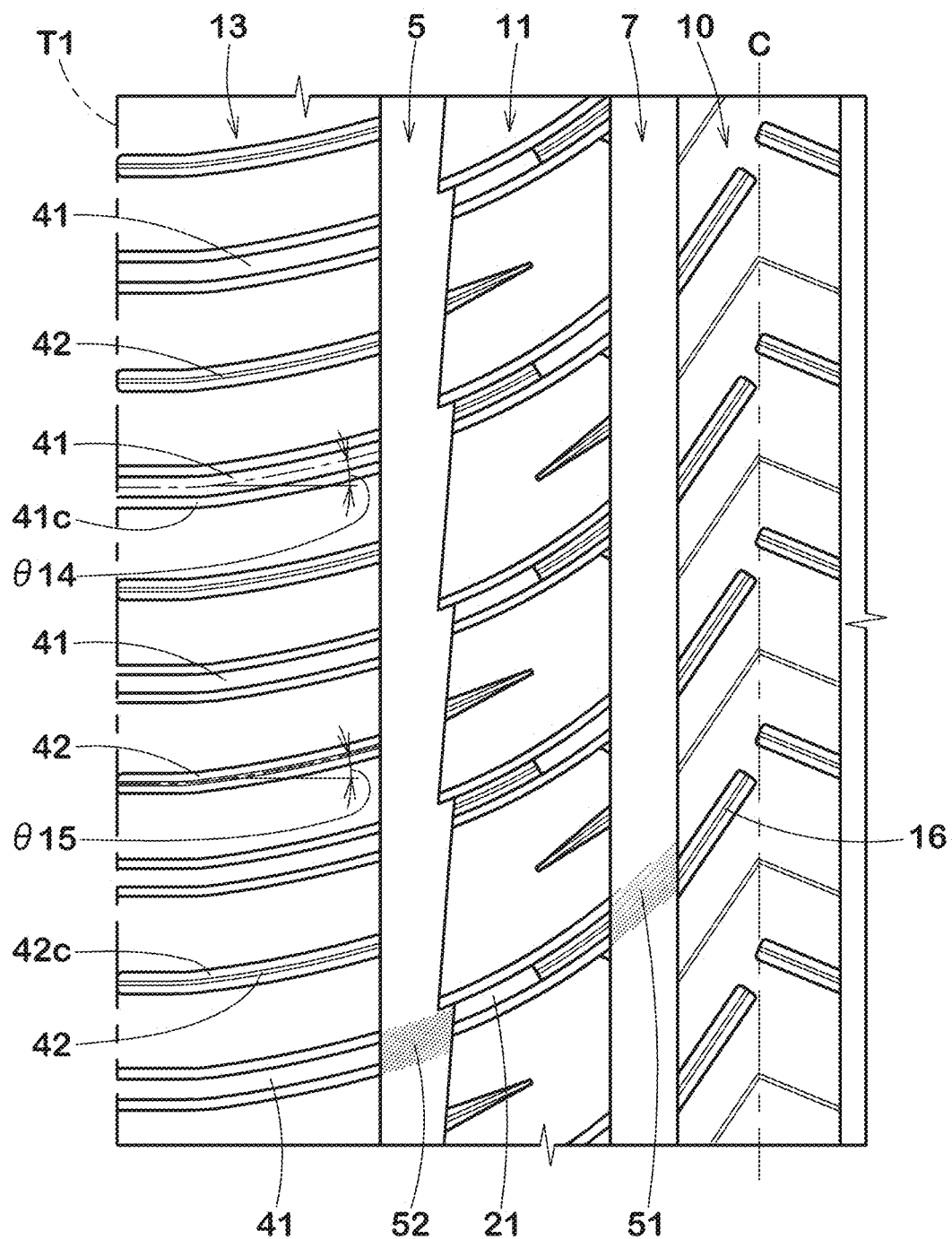
FIG. 8 shows a partial top view of a first shoulder land portion, the partial top view of the first middle land portion, and the partial top view of the crown land portion, shown in FIG. 1.

FIG. 8 shows partial top views of the first shoulder land portion 13, the first middle land portion 11 and the crown land portion 10.

As shown, the first shoulder land portion 13 is provided with a plurality of first shoulder lateral grooves 41 and a plurality of first shoulder sipes 42.

In this embodiment, the first shoulder lateral grooves 41 and the first shoulder sipes 42 are arranged alternately in the tire circumferential direction.

The first shoulder lateral groove 41 extends from the first shoulder circumferential groove 5 to at least the first tread edge T1.

The first shoulder lateral groove 41 in this example comprises a portion inclined with respect to the tire axial direction to the first direction toward the axially inside.

The maximum angle θ14 of the first shoulder lateral groove 41 with respect to the tire axial direction is, for example, not less than 10 degrees, but not more than 20 degrees. Such first shoulder lateral grooves 41 help to improve the wet performance and the on-snow performance.

The first shoulder lateral groove 41 is provided with a chamfer 41c. For the chamfer 41c of the first shoulder lateral groove 41, the configuration of the chamfer 21c of the first middle lateral groove 21 (shown in FIGS. 6 and 7) can be employed, therefore, redundant descriptions will be omitted.

The first shoulder sipe 42 in this example extends from the first shoulder circumferential groove 5 to the first tread edge T1. But, it may be possible to end the first shoulder sipe 42 before reaching the first tread edge T1.

The first shoulder sipe 42 in this example comprises a portion inclined with respect to the tire axial direction to the first direction toward the axially inside.

The maximum angle θ15 of the first shoulder sipe 42 with respect to the tire axial direction is not less than 10 degrees, but not more than 20 degrees.

It is preferable that the first shoulder sipes 42 extend along the first shoulder lateral grooves 41, and the angular difference between them is not more than 5 degrees.

In cooperation with the first shoulder lateral grooves 41, such first shoulder sipes 42 can provide large traction when running on wet roads and snowy roads.

The first shoulder sipe 42 is provided with a chamfer 42c.

For the chamfer 42c of the first shoulder sipe 42, the configuration of the chamfer 16c (shown in FIG. 3) of the first sipe 16 can be employed, therefore, redundant descriptions will be omitted.

It is preferable that the chamfer 42c is formed over the entire length of the first shoulder sipe 42, and the width of the chamfer 42c is constant over 80% or more of the length of the first shoulder sipe 42.

Such first shoulder sipes 42 can improve the wet performance while suppressing uneven wear of the first shoulder land portion 13.

The present embodiment is attempted to further improve various performances by optimizing the arrangement of the lateral grooves and the sipes which are adjacent via the circumferential grooves in the plan view of the tread portion 2.

Specifically, in the plan view of the tread portion 2 as shown in FIG. 8, when a first virtual zone 51 (dotted zone in FIG. 8) is defined by extending the first middle lateral groove 21 toward the crown land portion 10 while keeping the groove width and the inclination angle at the first middle lateral groove 21 end on the crown land portion 10 side, the first virtual zone 51 overlaps with the end of the sipe 16 on the first crown circumferential groove 7 side.

Further, in the plan view of the tread portion 2 as shown in FIG. 8, when a second virtual zone 52 (dotted zone in FIG. 8) is defined by extending the first shoulder lateral groove 41 toward the first middle land portion 11 while keeping the groove width and the inclination angle at the first shoulder lateral groove 41 end on the first middle land portion 11 side, the second virtual zone 52 overlaps with the end of the first middle lateral groove 21 on the first shoulder circumferential groove 5 side.

Thereby, the first sipes 16, the first middle lateral grooves 21 and the first shoulder lateral grooves 41 work together to provide a reaction force when running on snow, and thereby, it becomes possible to further increase the traction on the snow.

Figure 9:
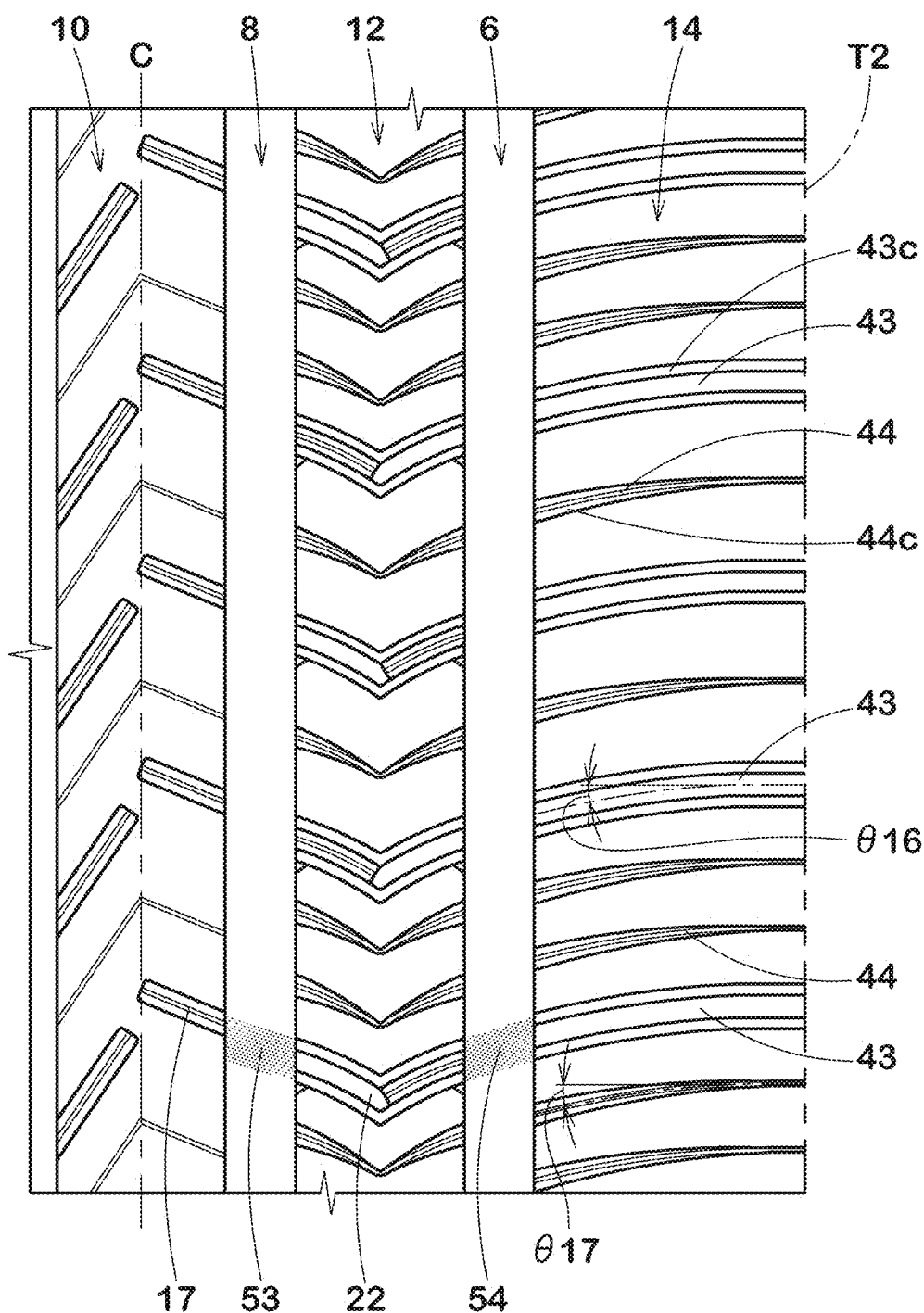
FIG. 9 shows a partial top view of a second shoulder land portion, the partial top view of the second middle land portion, and the partial top view of the crown land portion, shown in FIG. 1.

FIG. 9 shows partial top views of the second shoulder land portion 14, the second middle land portion 12 and the crown land portion 10.

As shown, the second shoulder land portion 14 is provided with a plurality of second shoulder lateral grooves 43 and a plurality of second shoulder sipes 44.

In this embodiment, one or two second shoulder sipes 44 are disposed between every two of the circumferential adjacent second shoulder lateral grooves 43.

The second shoulder lateral groove 43 extends from the second shoulder circumferential groove 6 to at least the second tread edge T2.

The second shoulder lateral groove 43 in this example comprises a portion inclined with respect to the tire axial direction to the above-mentioned first direction toward the second tread edge T2 from the second shoulder circumferential groove 6.

The maximum angle θ16 of the second shoulder lateral groove 43 with respect to the tire axial direction is, for example, not less than 10 degrees, but not more than 20 degrees.

Such second shoulder lateral grooves 43 help to improve the wet performance and on-snow performance.

The second shoulder lateral groove 43 is provided with a chamfer 43c.

For the chamfer 43c of the second shoulder lateral groove 43, the configuration of the chamfer 21c (shown in FIGS. 6 and 7) of the first middle lateral groove 21 can be employed, therefore, redundant descriptions will be omitted.

The second shoulder sipe 44 in this example extends from the second shoulder circumferential groove 6 to the second tread edge T2. But, it may be possible to end the second shoulder sipe 44 before reaching the second tread edge T2.

The second shoulder sipe 44 in this example comprises a portion inclined with respect to the tire axial direction to the first direction toward the second tread edge T2 from the second shoulder circumferential groove 6.

The maximum angle θ17 of the second shoulder sipe 44 with respect to the tire axial direction is not less than 10 degrees, but not more than 20 degrees.

It is preferable that the second shoulder sipes 44 extend along the second shoulder lateral grooves 43, and the angular difference between them is not more than 5 degrees. Such second shoulder sipes 44 can improve the wet performance and on-snow performance while suppressing uneven wear of the second shoulder land portion 14.

The second shoulder sipe 44 is provided with a chamfer 44c.

For the chamfer 44c of the second shoulder sipe 44, the configuration of the chamfer 16c (shown in FIG. 3) of the first sipe 16 can be employed, therefore, redundant descriptions will be omitted.

It is preferable that the chamfer 44c is formed over the entire length of the second shoulder sipe 44, and the width of the chamfer 44c becomes smaller toward the second tread edge T2.

In the plan view of the tread portion 2 as shown in FIG. 9, when a third virtual zone 53 (dotted in FIG. 9) is defined by extending each second middle lateral groove 22 toward the crown land portion 10 while keeping the groove width and the inclination angle at the second middle lateral groove 22 end on the crown land portion 10 side, the third virtual zone 53 overlaps with the end of the second sipe 17 on the second crown circumferential groove 8 side.

Further, in the plan view of the tread portion 2 as shown in FIG. 9, when a fourth virtual zone 54 (dotted in FIG. 9) is defined by extending each second shoulder lateral groove 43 toward the second middle land portion 12 while keeping the groove width and the inclination angle at the second shoulder lateral groove 43 end on the second middle land portion 12 side, the fourth virtual zone 54 overlaps with the second middle lateral groove 22 end on the second shoulder circumferential groove 6 side.

As a result, the second sipes 17, the second middle lateral grooves 22 and the second shoulder lateral grooves 43 work together to provide a reaction force when running on snow, and thereby, it becomes possible to increase the traction on the snow.

While detailed description has been made of a preferable embodiment of the present disclosure, the present disclosure can be embodied in various forms without being limited to the illustrated embodiment.

Comparison Tests

Based on the tread pattern shown in FIG. 1, pneumatic tires of size 225/45ZR18 were experimentally manufactured as working example tires Ex.1-Ex.9. As a comparative example tire Ref., a pneumatic tire of size 225/45ZR18 having the tread pattern shown in FIG. 10 was experimentally manufactured, wherein the crown land portion (a) was provided with sipes (b) inclined in one direction with respect to the tire axial direction over their entire lengths.

The comparative example tire had substantially the same structure as the working example tires except for the crown land portion (a).

The working example tires and comparative example tire were tested for steering stability on dry road surfaces and on-snow performance.

These test tires mounted on wheel rims of size 18×8.0J were attached to a test vehicle (2000 cc rear-wheel drive passenger car) and inflated to 220 kPa (front wheels) and 240 kPa (rear wheels). Then, using the test vehicle, the following tests were conducted.

<Steering Stability on Dry Road Surfaces>

During running on a dry road surface, a test driver evaluated the steering stability. The results are indicated in Table 1 by an index based on Ex.1 being 100, wherein the higher the index number, the better the steering stability.

<On-Snow Performance>

During running on a snowy road surface, a test driver evaluated the travelling performance. The results are indicated in Table 1 by an index based on EX.1 being 100, wherein the higher the index number, the better the on-snow performance.

TABLE 1

Figure 10:
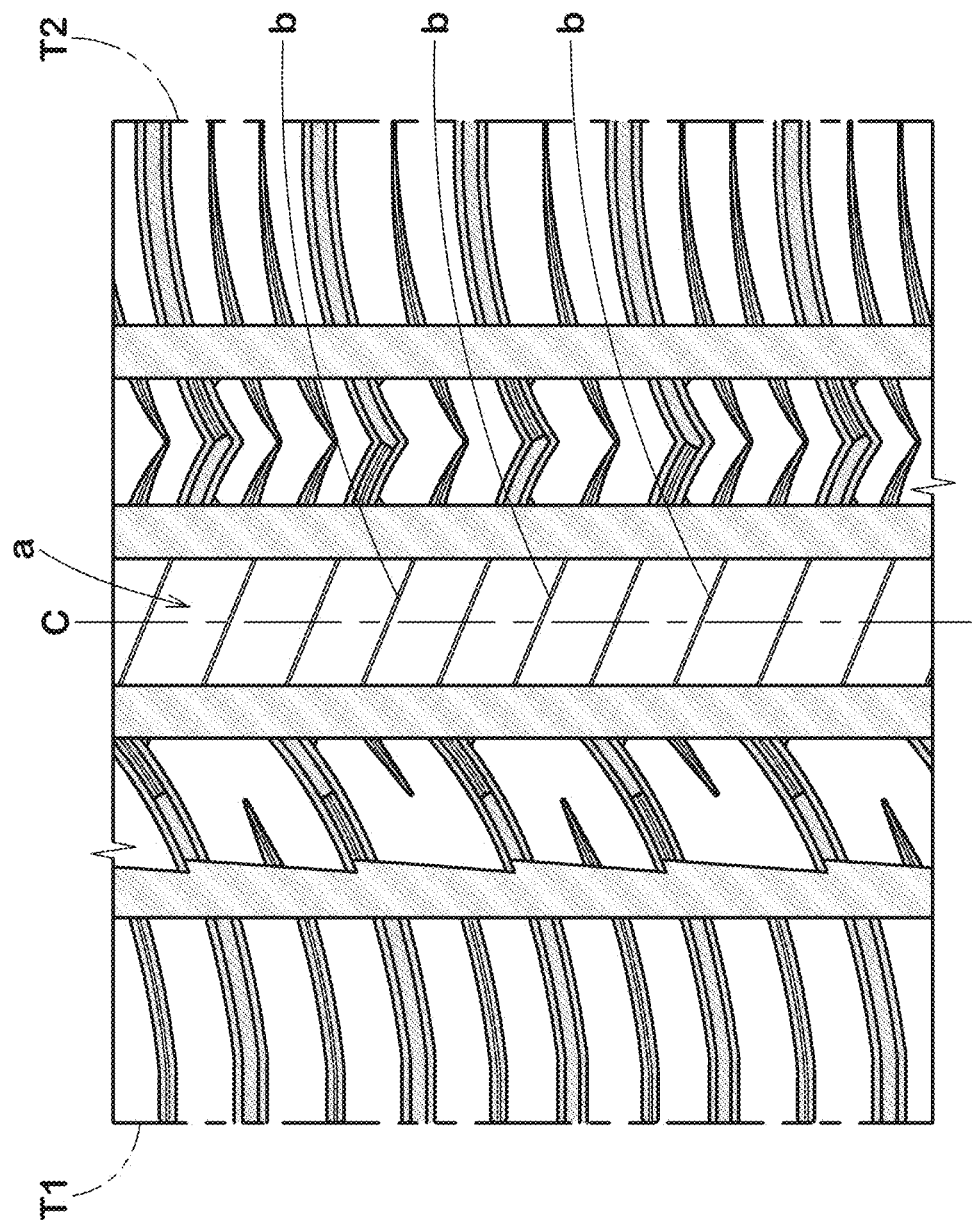
FIG. 10 is a developed partial view of a tread portion of a tire as a comparative example used in comparative tests.

| Tire | Ref. | Ex. 1 | Ex. 2 | Ex. 3 | Ex. 4 | Ex. 5 | Ex. 6 | Ex. 7 | Ex. 8 | Ex. 9 |
|---|---|---|---|---|---|---|---|---|---|---|
| tread pattern | FIG. 10 | FIG. 1 | FIG. 1 | FIG. 1 | FIG. 1 | FIG. 1 | FIG. 1 | FIG. 1 | FIG. 1 | FIG. 1 |
| first sipe angle θ1 (deg.) | — | 55 | 45 | 50 | 60 | 65 | 55 | 55 | 55 | 55 |
| second sipe angle θ2 (deg.) | — | 22 | 22 | 22 | 22 | 22 | 15 | 20 | 25 | 30 |

TABLE 1-continued

| Tire | Ref. | Ex. 1 | Ex. 2 | Ex. 3 | Ex. 4 | Ex. 5 | Ex. 6 | Ex. 7 | Ex. 8 | Ex. 9 |
|---|---|---|---|---|---|---|---|---|---|---|
| third sipe | | | | | | | | | | |
| first oblique portion angle θ3 (deg.) | — | 55 | 45 | 50 | 60 | 65 | 55 | 55 | 55 | 55 |
| second oblique portion angle θ4 (deg.) | — | 22 | 22 | 22 | 22 | 22 | 15 | 20 | 25 | 30 |
| steering stability on dry road | 98 | 100 | 97 | 99 | 99 | 97 | 97 | 99 | 99 | 97 |
| on-snow performance | 90 | 100 | 100 | 100 | 101 | 102 | 100 | 100 | 101 | 102 |

As shown in Table 1, with regard to the steering stability on dry road surfaces, the result of the comparative example tire Ref. was 98 points, while the results of the working example tires Ex.1 to Ex.9 were from 97 to 100 points. Thus, it can be seen that the steering stability of the working example tires was maintained or improved.

On the other hand, with regard to the on-snow performance, the result of the comparative example tire was 90 points, while the results of the working Example tires Ex.1 to Ex.9 were 100 to 102 points. Thus, it can be seen that the on-snow performance of the working Example tires was improved by more than 10 points compared to the comparative example tire.

Therefore, from the test results, it was confirmed that the tires according to the present disclosure can be improved in the on-snow performance while having the maintained or improved steering stability on dry road surfaces.

Statement of the Present Disclosure

The present disclosure is as follows.

Present Disclosure 1

A tire comprises:
a tread portion comprising at least one land portion having
a first longitudinal edge extending in the tire circumferential direction,
a second longitudinal edge extending in the tire circumferential direction, and
a ground contacting top surface between the first longitudinal edge and the second longitudinal edge,
wherein
the above-said at least one land portion is provided with a plurality of first sipes, a plurality of second sipes and a plurality of third sipes,
wherein
each of the first sipes extends from the first longitudinal edge toward the second longitudinal edge while inclining with respect to a tire axial direction to a first direction, and having a closed end within the ground contacting top surface,
each of the second sipes extends from the second longitudinal edge toward the first longitudinal edge while inclining with respect to the tire axial direction to the first direction, and having a closed end within the ground contacting top surface,
each of third sipes extends from the first longitudinal edge to the second longitudinal edge, and comprises
a first oblique portion extending from the first longitudinal edge toward the second longitudinal edge while inclining with respect to the tire axial direction to the first direction, and
a second oblique portion extending from the second longitudinal edge toward the first longitudinal edge while inclining with respect to the tire axial direction to the first direction.

Present Disclosure 2

The tire according to Present Disclosure 1, wherein
the above-said at least one land portion is a crown land portion provided on the tire equator.

Present Disclosure 3

The tire according to Present Disclosure 1 or 2, wherein
between every two of the circumferentially adjacent third sipes,
one of the first sipes and one of the second sipes are disposed.

Present Disclosure 4

The tire according to Present Disclosure 1, 2 or 3, wherein
each of the first sipes is provided with a chamfer at least partially in the length direction thereof.

Present Disclosure 5

The tire according to any one of Present Disclosures 1 to 4, wherein each of the first sipes is provided with a chamfer over the entire length of the first sipe.

Present Disclosure 6

The tire according to Present Disclosure 5, wherein
the width of the chamfer is constant over at least 80% of the first sipe in the length direction thereof.

Present Disclosure 7

The tire according to any one of Present Disclosures 1 to 6, wherein each of the second sipes is provided with a chamfer at least partially in the length direction thereof.

Present Disclosure 8

The tire according to any one of Present Disclosures 1 to 7, wherein each of the second sipes is provided with a chamfer over the entire length of the second sipe.

Present Disclosure 9

The tire according to Present Disclosure 8, wherein
the width of the chamfer is constant over at least 80% of the second sipe in the length direction thereof.

Present Disclosure 10

The tire according to any one of Present Disclosures 1 to 9, wherein each of the third sipes is not provided with a chamfer.

Present Disclosure 11

The tire according to any one of Present Disclosures 1 to 10, wherein the angle of the first oblique portion with respect to the tire axial direction is larger than the angle of the second oblique portion with respect to the tire axial direction.

Present Disclosure 12

The tire according to any one of Present Disclosures 1 to 11, wherein the angle of the first oblique portion with respect to the tire axial direction is not less than 50 degrees, but not more than 60 degrees.

Present Disclosure 13

The tire according to any one of Present Disclosures 1 to 12, wherein the angle of the second oblique portion with respect to the tire axial direction is not less than 20 degrees, but not more than 30 degrees.

Present Disclosure 14

The tire according to any one of Present Disclosures 1 to 13, wherein the length in the tire axial direction of each of the first sipes is not less than 40%, but not more than 50% of the maximum width in the tire axial direction of the ground contacting top surface.

Present Disclosure 15

The tire according to any one of Present Disclosures 1 to 14, wherein the length in the tire axial direction of each of the second sipes is not less than 40%, but not more than 50% of the maximum width in the tire axial direction of the ground contacting top surface.

Present Disclosure 16

The tire according to any one of Present Disclosures 1 to 15, wherein the distance in the tire circumferential direction from the closed end of each of the first sipes to the closed end of circumferentially adjacent one of the second sipes is not less than 10%, but not more than 15% of one pitch length in the tire circumferential direction of the first sipes.

DESCRIPTION OF THE REFERENCE SIGNS 2 tread portion
4 land portion
10a first longitudinal edge
10b second longitudinal edge
10s ground contacting top surface
16 first sipe
17 second sipe
18 third sipe
18A first oblique portion
18B second oblique portion

The invention claimed is:
1. A tire comprising:
a tread portion having a first tread edge and a second tread edge and comprising a crown land portion, a first middle land portion, a second middle land portion, a first shoulder land portion and a second shoulder land portion,
wherein
the crown land portion is disposed on a tire equator, having
a first longitudinal edge extending in a tire circumferential direction,
a second longitudinal edge extending in the tire circumferential direction, and
a ground contacting top surface between the first longitudinal edge and the second longitudinal edge,
wherein
the crown land portion is provided with first sipes, second sipes and third sipes,
each of the first sipes extends from the first longitudinal edge toward the second longitudinal edge while inclining with respect to a tire axial direction to a first direction, and having a closed end within the ground contacting top surface,
each of the second sipes extends from the second longitudinal edge toward the first longitudinal edge while inclining with respect to the tire axial direction to the first direction, and having a closed end within the ground contacting top surface, and
each of third sipes extends from the first longitudinal edge to the second longitudinal edge, and comprises:
a first oblique portion extending from the first longitudinal edge toward the second longitudinal edge while inclining with respect to the tire axial direction to the first direction, and
a second oblique portion extending from the second longitudinal edge toward the first longitudinal edge while inclining with respect to the tire axial direction to the first direction so as to have a V-shaped form oriented toward the first direction,
wherein
the first middle land portion is provided with transverse first middle lateral grooves, first terminating middle sipes, and second terminating middle sipes,
the transverse first middle lateral grooves, the first terminating middle sipes and the second terminating middle sipes are inclined with respect to the tire axial direction to the first direction same as the first sipes,
the transverse first middle lateral grooves extend across an entire width of the first middle land portion,
the first terminating middle sipes extend from an edge of the first middle land portion on a first tread edge side and are terminated within the first middle land portion, and
the second terminating middle sipes extend from an edge of the first middle land portion on a second tread edge side and are terminated within the first middle land portion,
wherein
the second middle land portion is provided with second middle lateral grooves and transverse middle sipes,
the second middle lateral grooves and the transverse middle sipes each extend across an entire width of the second middle land portion, forming a V-shaped form oriented oppositely to those of the third sipes, wherein
the first shoulder land portion is provided with first shoulder lateral grooves and first shoulder sipes, and
the first shoulder lateral grooves and the first shoulder sipes each extend across an entire width of the first shoulder land portion, while inclining with respect to the tire axial direction to the first direction such that an inclination angle gradually increases from the first tread edge toward the axially inside of the tire, and
wherein
the second shoulder land portion is provided with second shoulder lateral grooves and second shoulder sipes, and
the second shoulder lateral grooves and the second shoulder sipes each extend across an entire width of the second shoulder land portion, while inclining with respect to the tire axial direction to a second direction opposite to the first direction such that an inclination angle gradually increases from the second tread edge toward the axially inside of the tire.

2. The tire according to claim 1, wherein
one of the first sipes and one of the second sipes are disposed between every two of circumferentially adjacent sipes of the third sipes.

3. The tire according to claim 1, wherein
an angle of the first oblique portion with respect to the tire axial direction is larger than an angle of the second oblique portion with respect to the tire axial direction.

4. The tire according to claim 3, wherein
the angle of the first oblique portion with respect to the tire axial direction is not less than 50 degrees, but not more than 60 degrees.

5. The tire according to claim 4, wherein
the angle of the second oblique portion with respect to the tire axial direction is not less than 20 degrees, but not more than 30 degrees.

6. The tire according to claim 3, wherein
a length in the tire axial direction of each of the first sipes is not less than 40%, but not more than 50% of the maximum width in the tire axial direction of the ground contacting top surface.

7. The tire according to claim 6, wherein
the length in the tire axial direction of each of the second sipes is not less than 40%, but not more than 50% of the maximum width in the tire axial direction of the ground contacting top surface.

8. The tire according to claim 7, wherein
a distance in the tire circumferential direction from the closed end of each of the first sipes to the closed end of circumferentially adjacent one of the second sipes is not less than 10%, but not more than 15% of one pitch length in the tire circumferential direction of the first sipes.

9. The tire according to claim 1, wherein
each edge of each first sipe is provided with a chamfer of which width is constant over at least 80% of the first sipe in a length direction thereof, and
each edge of each second sipe is provided with a chamfer of which width is constant over at least 80% of the second sipe in a length direction thereof.

10. The tire according to claim 9, wherein
each of the third sipes is not provided with a chamfer.

11. The tire according to claim 10, wherein
in the first middle land portion,
each edge of each transverse first middle lateral groove is provided with a chamfer of which width is constant,
each edge of each first terminating middle sipe is provided with a chamfer of which width gradually increases from a terminated end to an open end of the first terminating middle sipe, and
each edge of each second terminating middle sipe is provided with a chamfer of which width gradually increases from a terminated end to an open end of the second terminating middle sipe; and
in the second middle land portion,
each edge of each V-shaped second middle lateral groove is provided with a chamfer of which width is constant, and
each edge of each V-shaped transverse middle sipe is provided with a chamfer of which width gradually increases from an apex of the V-shape form toward both sipe ends in the tire axial direction.

12. The tire according to claim 11, wherein
in the first shoulder land portion,
each edge of each first shoulder lateral groove is provided with a chamfer of which width is constant, and
each edge of each first shoulder sipe is provided with a chamfer of which width is constant; and
in the second shoulder land portion,
each edge of each second shoulder groove is provided with a chamfer of which width is constant, and
each edge of each second shoulder sipe is provided with a chamfer of which width gradually increases from the second tread edge toward an axially inner sipe end.

13. The tire according to claim 1, wherein
in the first middle land portion,
one of the transverse first middle lateral grooves is disposed between one of the first terminating middle sipes and one of the second terminating middle sipes which are adjacent to each other in the tire circumferential direction, and
in the second middle land portion,
one or two of the transverse middle sipes are disposed between two of the second middle lateral grooves which are adjacent to each other in the tire circumferential direction.

14. The tire according to claim 1, wherein
in the second shoulder land portion,
one or two of the second shoulder sipes is disposed between two of the second shoulder lateral grooves which are adjacent to each other in the tire circumferential direction, and
in the first shoulder land portion,
the first shoulder lateral grooves and the first shoulder sipes are arranged one after another in the tire circumferential direction.

* * * * *